United States Patent
Coccia et al.

(10) Patent No.: US 8,149,599 B2
(45) Date of Patent: Apr. 3, 2012

(54) CONTROLLER CIRCUIT AND SYSTEM HAVING SUCH A CONTROLLER CIRCUIT

(75) Inventors: Antonio Coccia, Baden (CH); Francisco Canales, Baden-Dättwil (CH); Gerold Knapp, Ehrendingen (CH); Marcel Merk, Zürich (CH); Fabiana Da Silveira Cavalcante, Zürich (CH)

(73) Assignee: ABB Research Ltd, Zurich (CH)

( * ) Notice: Subject to any disclaimer, the term of this patent is extended or adjusted under 35 U.S.C. 154(b) by 629 days.

(21) Appl. No.: 12/335,828

(22) Filed: Dec. 16, 2008

(65) Prior Publication Data

US 2009/0154200 A1 Jun. 18, 2009

(30) Foreign Application Priority Data

Dec. 18, 2007 (EP) .................................. 07024504

(51) Int. Cl.
*H02M 3/335* (2006.01)
(52) U.S. Cl. .................................................. 363/21.02
(58) Field of Classification Search .... 363/21.02–21.18; 323/222
See application file for complete search history.

(56) References Cited

U.S. PATENT DOCUMENTS

| 5,946,206 | A  | * | 8/1999 | Shimizu et al. ................. 363/65 |
| 6,344,979 | B1 |   | 2/2002 | Huang et al. |
| 7,548,435 | B2 | * | 6/2009 | Mao ................................ 363/16 |
| 7,746,041 | B2 | * | 6/2010 | Xu et al. ....................... 323/223 |

FOREIGN PATENT DOCUMENTS

DE 197 50 041 C1 1/1999

OTHER PUBLICATIONS

Bo Yang et al., "LLC Resonant Converter for Front End DC/DC Conversion", IEEE, 2002, pp. 1108-1112.

* cited by examiner

*Primary Examiner* — Adolf Berhane
*Assistant Examiner* — Yemane Mehari
(74) *Attorney, Agent, or Firm* — Buchanan Ingersoll & Rooney PC

(57) ABSTRACT

A controller circuit is specified, having a step-up controller, a resonant converter connected downstream of the step-up controller on the output side, a transformer, a rectifier, which rectifier is connected to the secondary winding of the transformer on the input side, and a CLL resonant circuit connected to the resonant converter and to the primary winding of the transformer, which CLL resonant circuit has a resonance capacitance and a first and a second resonance inductance. In order to reduce the switching losses, the CLL resonant circuit is embodied as a "T" circuit.

2 Claims, 6 Drawing Sheets

CONTROLLER CIRCUIT AND SYSTEM HAVING SUCH A CONTROLLER CIRCUIT

RELATED APPLICATION

This application claims priority under 35 U.S.C. §119 to European Patent Application No. 07024504.8 filed in Europe on Dec. 18, 2007, the entire content of which is hereby incorporated by reference in its entirety.

TECHNICAL FIELD

The disclosure relates to the field of power electronics. It is based on a controller circuit and a system having such a controller circuit.

BACKGROUND INFORMATION

Controller circuits are used nowadays in many applications primarily in industry and in traction applications, for example in the railroad sector. A controller circuit for converting a first DC voltage into a second DC voltage is specified for example in DE 197 50 041 C1, wherein the controller circuit comprises a step-up controller and a converter connected downstream of the step-up controller on the output side, in particular in a half-bridge circuit, the converter having a DC voltage circuit formed by capacitive energy stores and being connected to the secondary side of a transformer via an inductor on the output side. Furthermore, the controller circuit comprises a rectifier, which is connected to the secondary winding of the transformer on the input side. The step-up controller and the converter in DE 197 50 041 C1 are driven in such a way that the capacitive energy stores, the inductor and the leakage inductance of the transformer form a resonant tuned circuit, that is to say that the step-up controller, on the output side, applies a corresponding AC voltage to the capacitive energy stores by clocking the DC voltage at its input, such that the resonant tuned circuit is caused to attain resonance.

What is problematic about a controller circuit mentioned above is that despite the resonant tuned circuit described above, switching losses can still occur in the power semiconductor switches of the converter, and subject said switches to a high degree of loading, in particular thermal loading. As a result, the power semiconductor switches age correspondingly rapidly and the failure rates of the power semiconductor switches rise with the operating period of the controller circuit. A high availability of the controller circuit, such as is essential in traction applications, for example, is then no longer afforded.

U.S. Pat. No. 6,344,979 B1 likewise specifies a controller circuit in FIG. 4, for example, comprising a resonant converter, a transformer, a rectifier, which rectifier is connected to the secondary winding of the transformer on the input side, and a CLL resonant circuit connected to the resonant converter and to the primary winding of the transformer, which CLL resonant circuit has a resonance capacitance and a first and a second resonance inductance. As discussed, DE 197 50 041 C1 and U.S. Pat. No. 6,344,979 B1 have these observed drawbacks.

SUMMARY

A controller circuit is disclosed which has low switching losses and, in addition, represents an alternative solution. A system is disclosed comprising controller circuits which can be realized in a particularly simple manner.

A controller circuit is disclosed having a step-up controller, having a resonant converter connected downstream of the step-up controller on the output side, having a transformer, having a rectifier, which rectifier is connected to the secondary winding of the transformer on the input side, and having a CLL resonant circuit connected to the resonant converter and to the primary winding of the transformer, which CLL resonant circuit has a resonance capacitance and a first and a second resonance inductance, wherein the resonance capacitance is connected in series with the first resonance inductance, the first resonance inductance being connected to a first connection point of the primary winding of the transformer and the resonance capacitance being connected to the resonant converter, and the second resonance inductance is connected to the junction point between the resonance capacitance and the first resonance inductance, the second resonance inductance being connected to a second connection point of the primary winding of the transformer and the second connection point of the primary winding of the transformer being connected to the resonant converter.

In another aspect a controller circuit arrangement is disclosed. Such a controller circuit arrangement comprises a step up controller; a resonant converter connected downstream of the step up controller on an output side; a transformer and a rectifier, which rectifier is connected to a secondary winding of the transformer on the input side; and a CLL resonant circuit connected to the resonant converter and to a primary winding of the transformer, which CLL resonant circuit has a resonance capacitance and a first and a second resonance inductance.

These and further objects, advantages and features of the pre-sent disclosure will become apparent from the following detailed description of exemplary embodiments of the disclosure in conjunction with the drawing.

Figure 1:
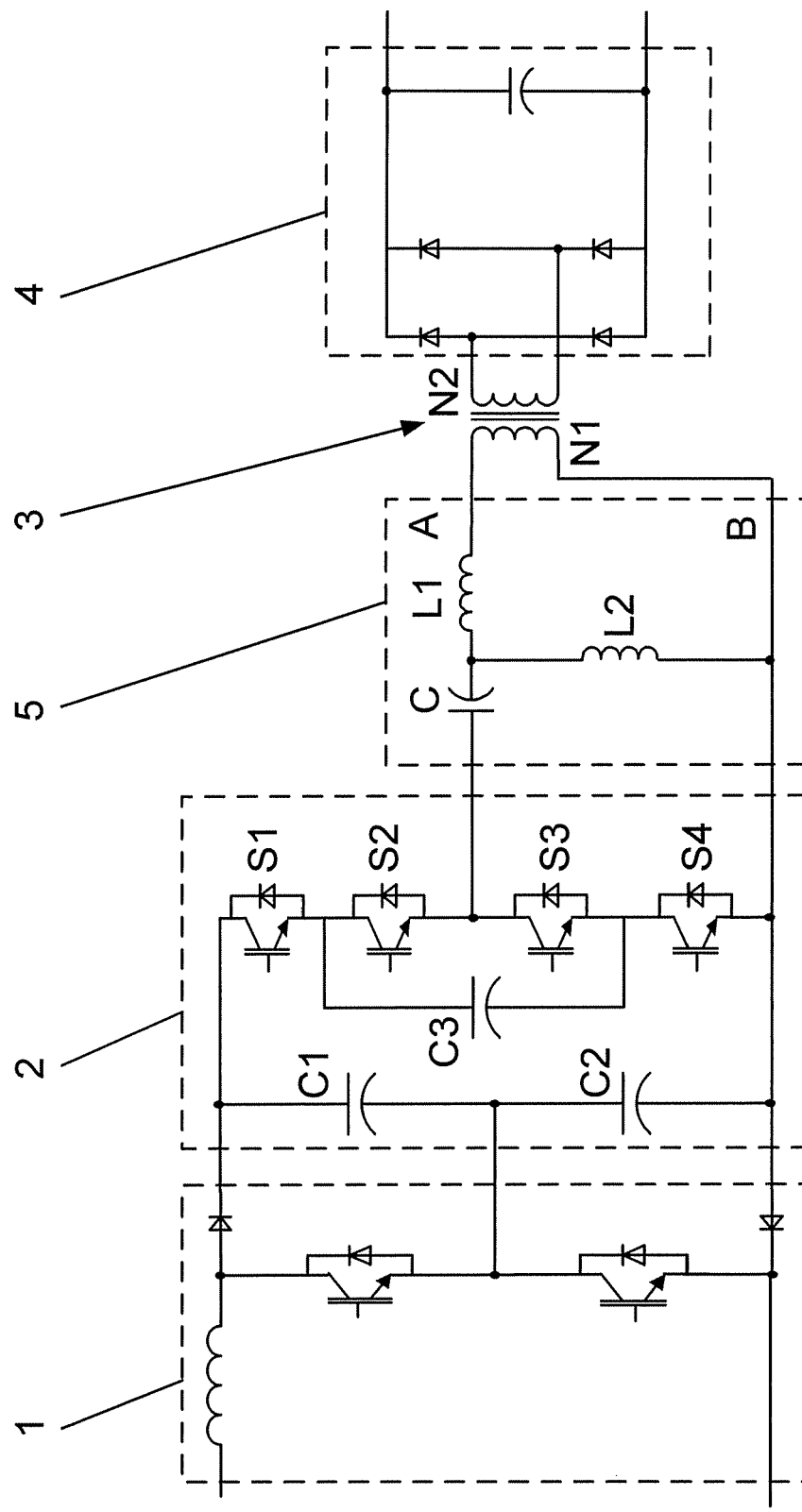
FIG. 1 shows a first exemplary embodiment of a controller circuit according to the disclosure.

The reference symbols used in the drawing and their meaning are summarized in the List of Reference Symbols. In principle, identical parts are provided with identical reference symbols in the figures. The exemplary embodiments described represent the subject matter of the disclosure by way of example and have no restrictive effect.

DETAILED DESCRIPTION

The controller circuit according to the disclosure comprises a step-up controller, a resonant converter, a transformer, a rectifier, which rectifier is connected to the secondary winding of the transformer on the input side, and a CLL resonant circuit connected to the resonant converter and to the primary winding of the transformer, which CLL resonant circuit has a resonance capacitance and a first and a second resonance inductance. According to the disclosure, the resonance capacitance is connected in series with the first resonance inductance, the first resonance inductance being connected to a first connection point of the primary winding of the transformer. Furthermore, the resonance capacitance is connected to the resonant converter and the second resonance inductance is connected to the junction point between the resonance capacitance and the first resonance inductance, the second resonance inductance being connected to a second connection point of the primary winding of the trans-former and the second connection point of the primary winding of the transformer being connected to the resonant converter. The CLL resonant circuit is accordingly embodied as a "T" circuit.

By means of the CLL resonant circuit, which is driven by the resonant converter in such a way that it oscillates at its resonant frequency, it is additionally possible, alongside the currentless switching on and off of the drivable bidirectional power semiconductor switches of the resonant converter that can be used, for the drivable bidirectional power semiconductor switches of the resonant converter also to be switched on and off in voltageless fashion. As a result, the switching losses of the drivable bidirectional power semiconductor switches of the resonant converter can be reduced further and a low-loss conversion of a first DC voltage, present at the input of the step-up controller, into a second DC voltage, present at the output of the rectifier, is possible. As a result of the reduction of the switching losses, the lifetime of the drivable bidirectional power semiconductor switches is correspondingly lengthened and the failure rates of the controller circuit can be kept low, resulting in a high availability of the controller circuit. The controller circuit therefore additionally represents an alternative solution.

The system according to the disclosure has at least two of the abovementioned controller circuits according to the disclosure, the step-up controllers of the controller circuits being connected in parallel or in series with one another on the input side. Accordingly, the system is constructed extremely simply, wherein a high input DC current is possible by means of the parallel connection of the step-up controllers on the input side and an increased electrical energy can thus be transferred. The series connection of the step-up controllers on the input side in turn enables a high input DC voltage and thus likewise the transfer of a large amount of electrical energy.

Figure 2:
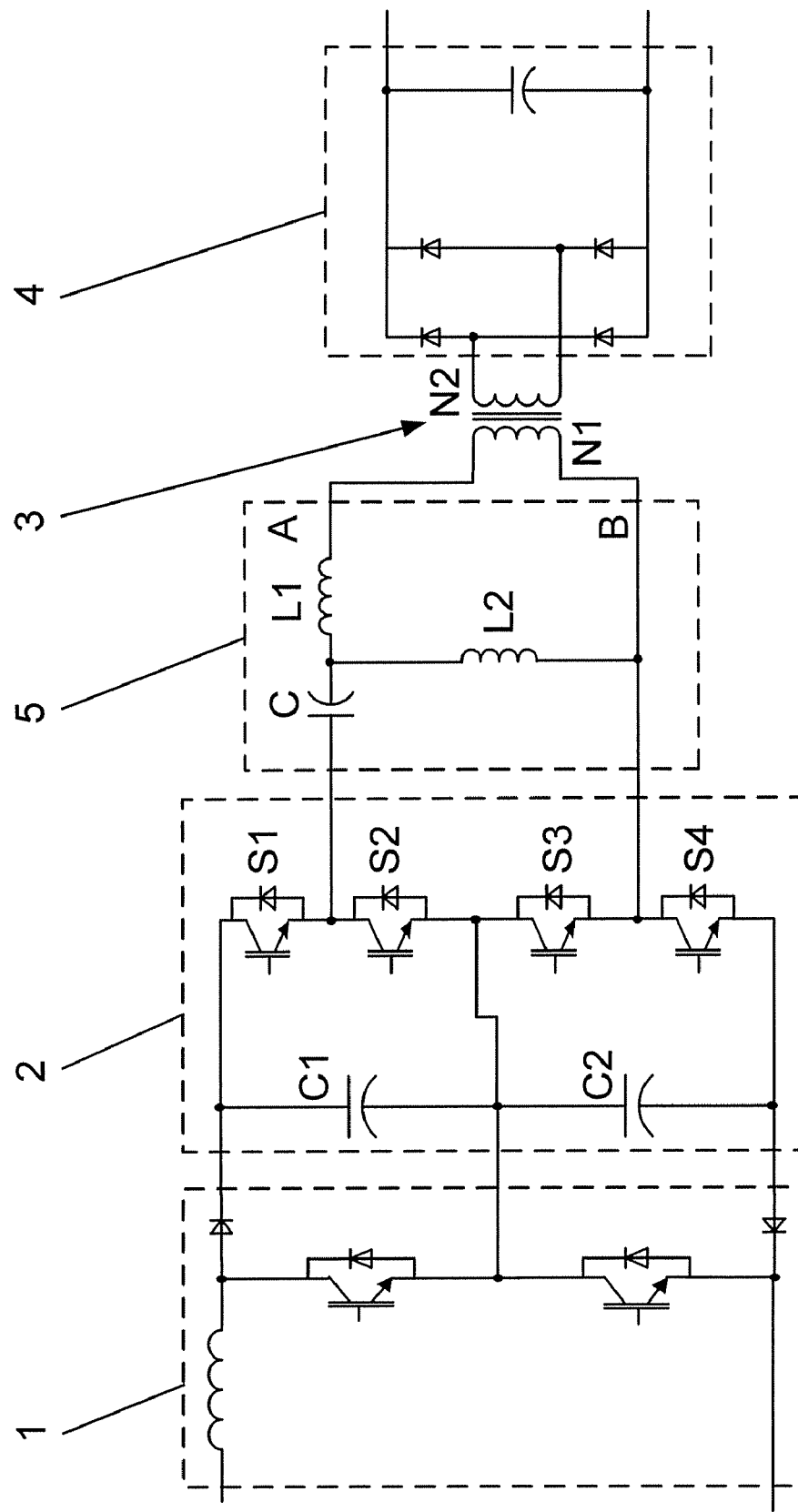
FIG. 2 shows a second exemplary embodiment of a controller circuit according to the disclosure.

FIG. 1 and FIG. 2 show a first and a second exemplary embodiment, respectively, of a controller circuit according to the disclosure, wherein the controller circuit comprises a step-up controller 1, a resonant converter 2 connected downstream of the step-up controller 1 on the output side, a transformer 3 and a rectifier 4, which is connected to the secondary winding N2 of the transformer 3 on the input side. The step-up controller 1 can be embodied as in the exemplary embodiment according to FIG. 1, but also in any other conceivable embodiment. The rectifier 4 can be embodied as in the embodiment according to FIG. 1, but also in any other conceivable embodiment known to the person skilled in the art. Furthermore, the controller circuit comprises a CLL resonant circuit 5 connected to the resonant converter 2 and to the primary winding N1 of the transformer 3, which CLL resonant circuit 5 has a resonance capacitance C and a first and a second resonance inductance L1, L2.

According to the disclosure, then, the resonance capacitance C is connected in series with the first resonance inductance L1, the first resonance inductance L1 being connected to a first connection point A of the primary winding N1 of the transformer 3 and the resonance capacitance C being connected to the resonant converter 2. The second resonance inductance L2 is connected to the junction point between the resonance capacitance C and the first resonance inductance L1, the second resonance inductance L2 being connected to a second connection point B of the primary winding N1 of the transformer 3 and the second connection point B of the primary winding N1 of the transformer 3 being connected to the resonant converter 2. The CLL resonant circuit 5 can be driven by the resonant converter 2 in such a way that the CLL resonant circuit 5 oscillates at its resonant frequency. As a result, it is additionally possible, alongside the currentless switching on and off of the drivable bidirectional power semiconductor switches of the resonant converter 2 that can be used, for the drivable bidirectional power semiconductor switches of the resonant converter 2 also to be switched on and off in voltageless fashion. As a result, the switching losses of the drivable bidirectional power semiconductor switches of the resonant converter 2 can be reduced further and a low-loss conversion of a first DC voltage, present at the input of the step-up controller 1, into a second DC voltage, present at the output of the rectifier 4, is possible. As a result of the reduction of the switching losses, the lifetime of the drivable bidirectional power semiconductor switches is correspondingly lengthened and the failure rates of the controller circuit can be kept low, resulting in a high availability of the controller circuit. It can be advantageous if the drivable bidirectional power semiconductor switches of the resonant converter 2 switch during operation at a switching frequency corresponding to the resonant frequency of the CLL resonant circuit 5 since particularly low switching losses then occur during the currentless switching on and off of the drivable bidirectional power semiconductor switches and during the voltageless switching on and off of the drivable bidirectional power semiconductor switches. If the switching frequency of the drivable bidirectional power semiconductor switches is higher than the resonant frequency, then the oscillations generated by the switching operations of the drivable bidirectional power semiconductor switches, both at the input side of the controller circuit, i.e. at the input of the step-up controller 1, and at the output side of the controller circuit, i.e. at the output of the rectifier 4, can be kept low to a desired extent, the switching losses of the drivable bidirectional power semiconductor switches still being low in this case.

In accordance with FIG. 1, the resonant converter 2 has a first capacitive energy store C1, a second capacitive energy store C2, which is connected in series with the first capacitive energy store C1, a third capacitive energy store C3 and a first, a second, a third and a fourth drivable bidirectional power semiconductor switch S1, S2, S3, S4, the drivable bidirectional power semiconductor switches S1, S2, S3, S4, being connected in series. The first capacitive energy store C1 is connected to the first drivable bidirectional power semiconductor switch S1 and the second capacitive energy store C2 is connected to the fourth drivable bidirectional power semiconductor switch S4.

In addition, the third capacitive energy store C3 is connected to the junction point between the first and the second drivable bidirectional power semiconductor switches S1, S2, and to the junction point between the third and the fourth drivable bidirectional power semiconductor switches S3, S4. Furthermore, the resonance capacitance C is connected to the junction point between the second and the third drivable bidirectional power semiconductor switches S2, S3 and the second connection point B of the primary winding N1 of the transformer 3 is connected to the junction point between the second capacitive energy store C2 and the fourth drivable bidirectional power semiconductor switch S4. The third capacitive energy store C3 brings about a stabilization of the voltage at the drivable bidirectional power semiconductor switches S1, S2, S3, S4, which corresponds in particular to half the voltage present across the first and second capacitive energy stores C1, C2.

In method terms, in the case of the controller circuit in accordance with FIG. 1, the first, second, third and fourth drivable bidirectional power semiconductor switches S1, S2, S3, S4 are driven in each case by means of a drive signal, the drive signal being generated in the manner of a pulse width modulation. The switching frequency of the drivable bidirectional power semiconductor switches S1, S2, S3, S4 is determined by the drive signal. In order to achieve the advantages already mentioned above, the drive signal for the first drivable bidirectional power semiconductor switch S1 is in phase with respect to the carrier signal of the pulse width modulation. In contrast to this, the drive signal for the second drivable bidirectional power semiconductor switch S2 is in antiphase with respect to the carrier signal of the pulse width modulation. The degree of modulation of the drive signal of the first drivable bidirectional power semiconductor switch S1 and the degree of modulation of the drive signal of the second drivable bidirectional power semiconductor switch S2 can be chosen in each case to be of the order of magnitude of 25% or 75%. The complementary drive signal for the second drivable bidirectional power semiconductor switch S2 is then chosen as drive signal for the third drivable bidirectional power semiconductor switch S3 and the complementary drive signal for the second drivable bidirectional power semiconductor switch S2 is chosen as drive signal for the fourth drivable bidirectional power semiconductor switch S4.

In accordance with FIG. 2, the resonant converter 2 has a first capacitive energy store C1, a second capacitive energy store C2, which is connected in series with the first capacitive energy store C1, and a first, a second, a third and a fourth drivable bidirectional power semiconductor switch S1, S2, S3, S4, the drivable bidirectional power semiconductor switches S1, S2, S3, S4 being connected in series. The first capacitive energy store C1 is connected to the first drivable bidirectional power semiconductor switch S1, the junction point between the first and the second capacitive energy stores C1, C2 is connected to the junction point between the second and the third drivable bidirectional power semiconductor switches S2, S3, and the second capacitive energy store C2 is connected to the fourth drivable bidirectional power semiconductor switch S4. Furthermore, the resonance capacitance C is connected to the junction point between the first and the second drivable bidirectional power semiconductor switches S1, S2 and the second connection point B of the primary winding (N1) of the transformer 3 is connected to the junction point between the third and the fourth drivable bidirectional power semiconductor switches S3, S4.

In method terms, in the case of the controller circuit in accordance with FIG. 2, the first, second, third and fourth drivable bidirectional power semiconductor switches S1, S2, S3, S4 are driven in each case by means of a drive signal, the drive signal being generated in the manner of a pulse width modulation. In order to achieve the advantages already mentioned above, the drive signal for the first drivable bidirectional power semiconductor switch S1 is in phase with respect to the carrier signal of the pulse width modulation. In contrast to this, the drive signal for the fourth drivable bidirectional power semiconductor switch S4 is in antiphase with respect to the carrier signal of the pulse width modulation. Further, the degree of modulation of the drive signal of the first drivable bidirectional power semiconductor switch S1 and the degree of modulation of the drive signal of the fourth drivable bidirectional power semiconductor switch S2 can be chosen in each case to be of the order of magnitude of 25% or 75%. The complementary drive signal for the first drivable bidirectional power semiconductor switch S2 is then chosen as drive signal for the second drivable bidirectional power semiconductor switch S2 and the complementary drive signal for the fourth drivable bidirectional power semiconductor switch S4 is chosen as drive signal for the third drivable bidirectional power semiconductor switch S3.

It is conceivable for the second resonance inductance L2 generally to be integrated in the transformer 3. It is also conceivable, however, for the first resonance inductance L1 generally to be integrated either additionally or by itself in the transformer 3. As a result of these measures, space can be saved and the manufacture of the controller circuit, in particular mounting, is simplified.

The first, second, third and fourth drivable bidirectional power semiconductor switches S1, S2, S3, S4 can be embodied in each case as an integrated thyristor commutated via the drive electrode (IGCT—Integrated Gate-Commutated Thyristor) with an associated diode connected in parallel. Such a thyristor has particularly low active power losses in conjunction with high robustness, primarily at high voltages and in particular at overvoltages. However, it is also conceivable, as shown in the embodiments according to FIG. 1 to FIG. 6, for the first, second, third and fourth drivable bidirectional power semiconductor switches S1, S2, S3, S4 to be embodied in each case as a bipolar transistor having a drive electrode arranged in insulated fashion (IGBT—Insulated Gate Bipolar Transistor) with an associated diode connected in parallel. Such a transistor is distinguished by a high switching frequency and thus by small oscillations in the current and in the voltage.

Figure 3:
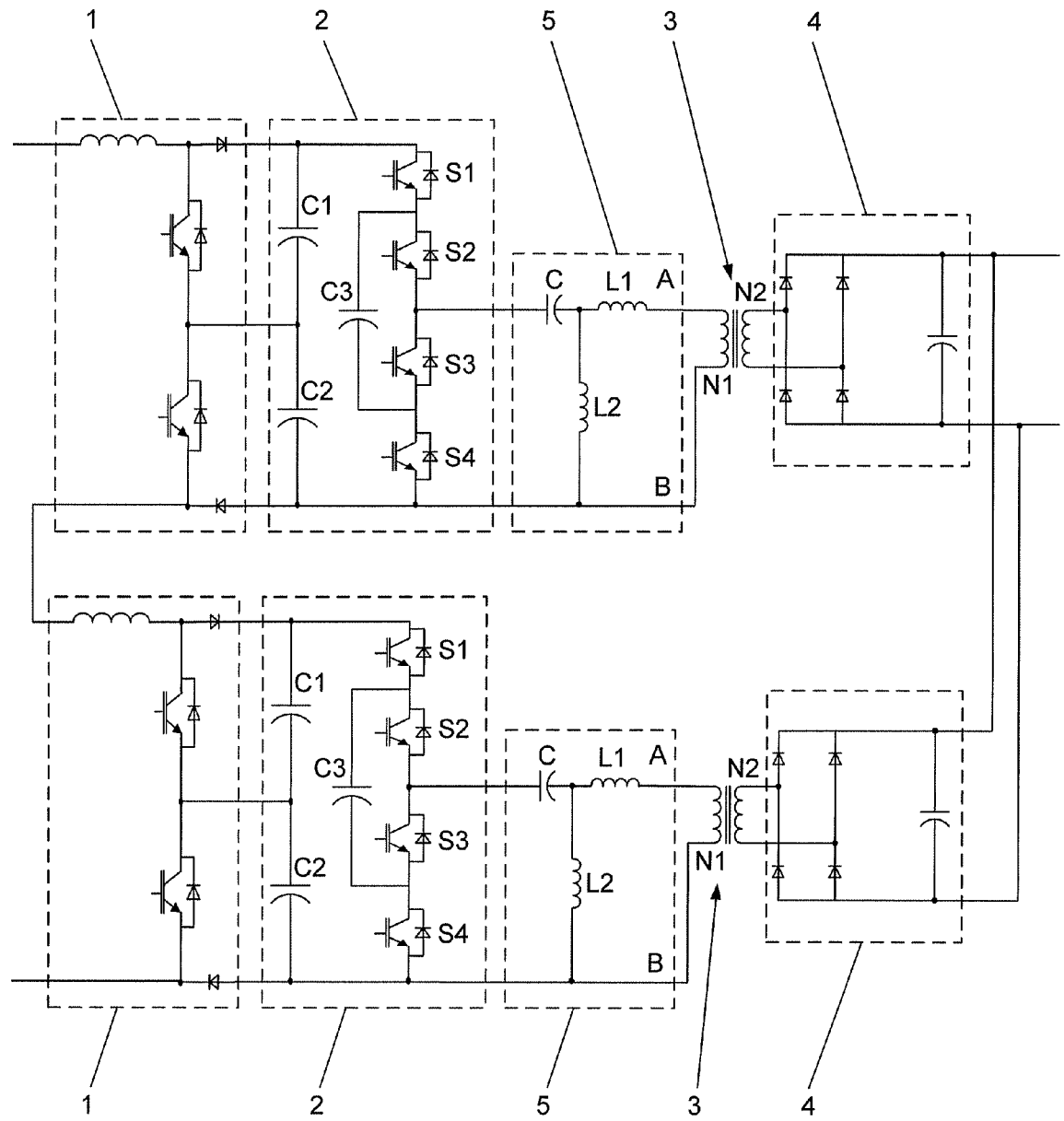
FIG. 3 shows a first exemplary embodiment of a system according to the disclosure comprising controller circuits in accordance with FIG. 1.
Figure 4:
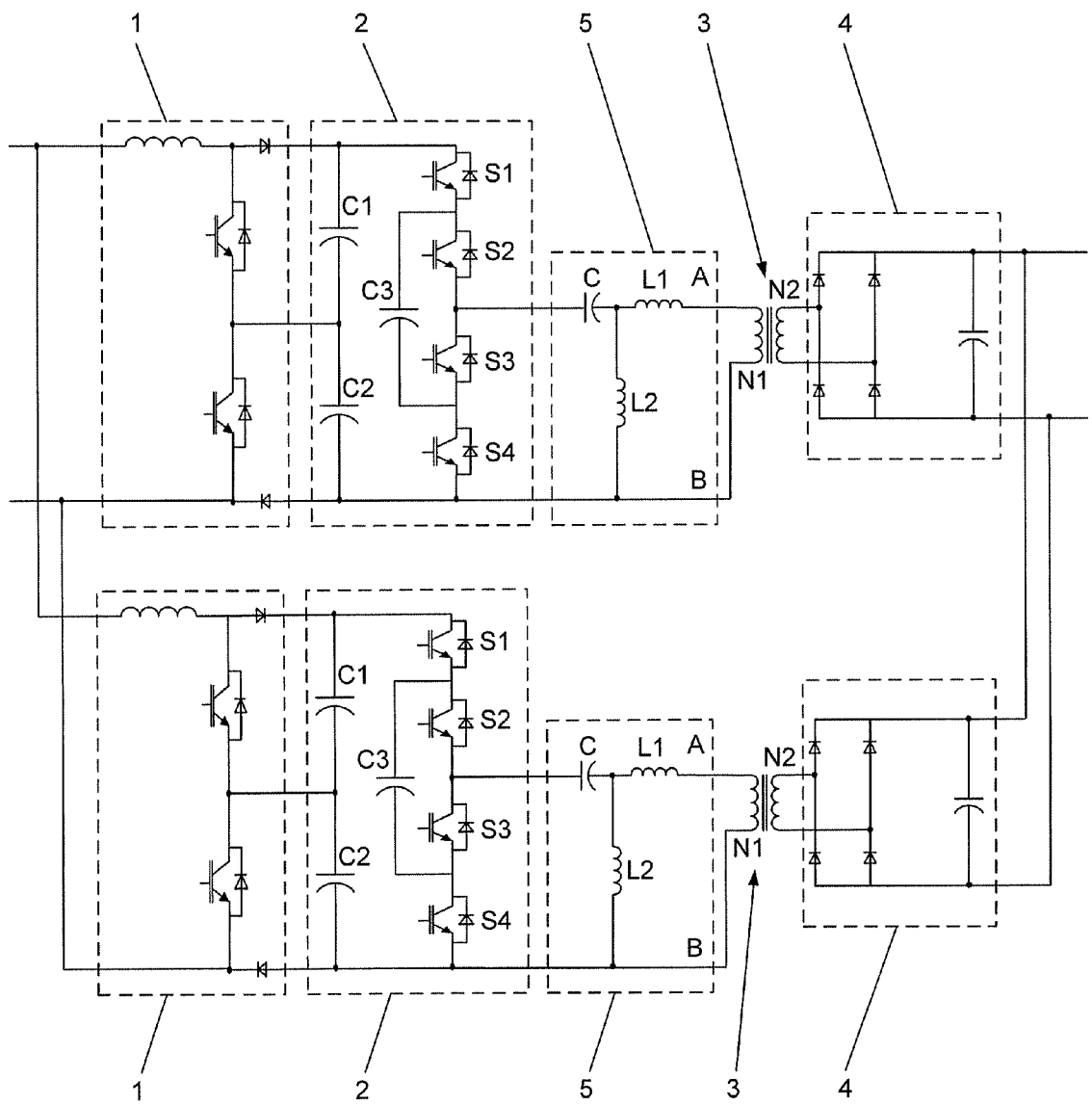
FIG. 4 shows a second exemplary embodiment of a system according to the disclosure comprising controller circuits in accordance with FIG. 1.
Figure 5:
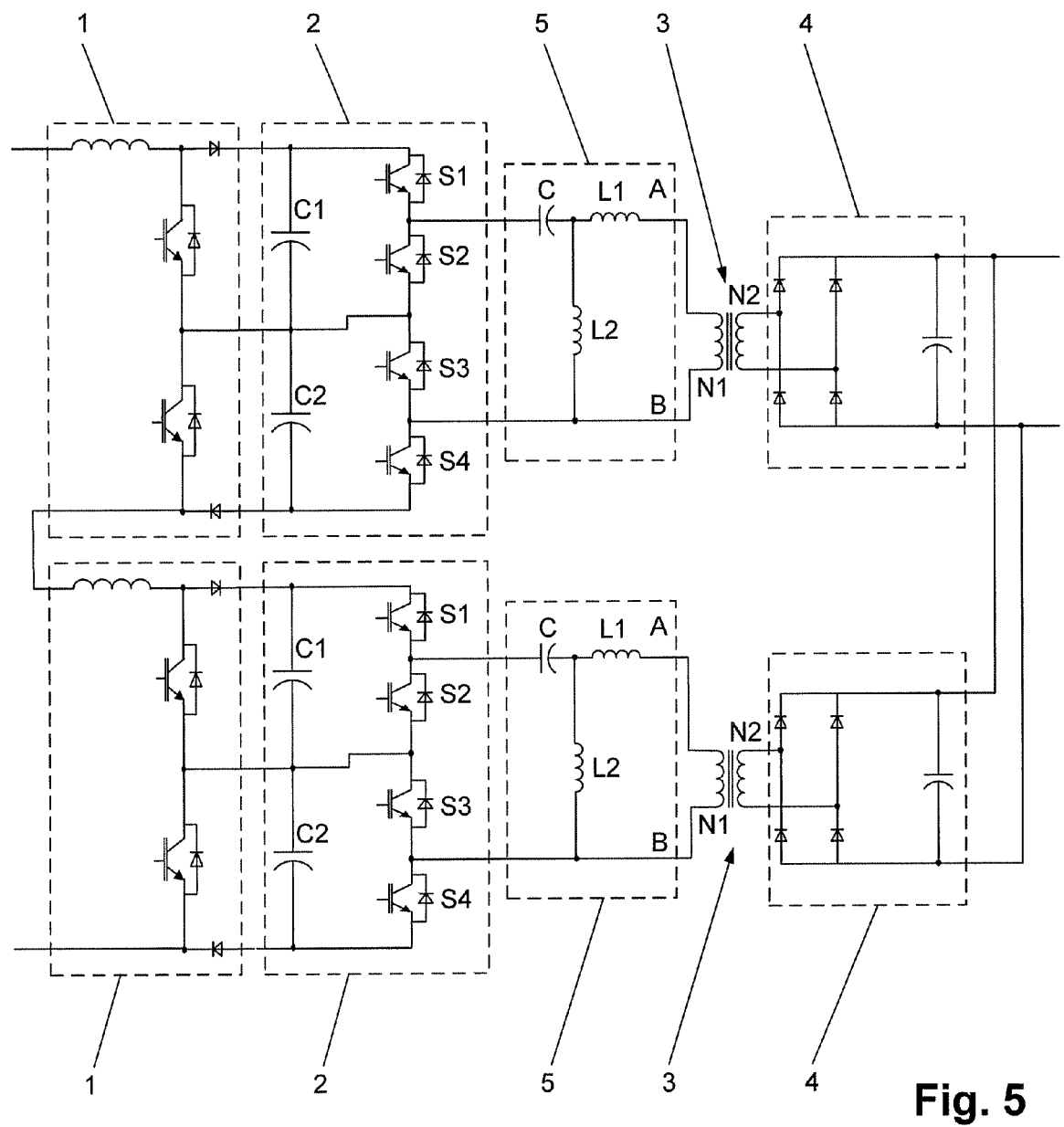
FIG. 5 shows a third exemplary embodiment of a system according to the disclosure comprising controller circuits in accordance with FIG. 2.
Figure 6:
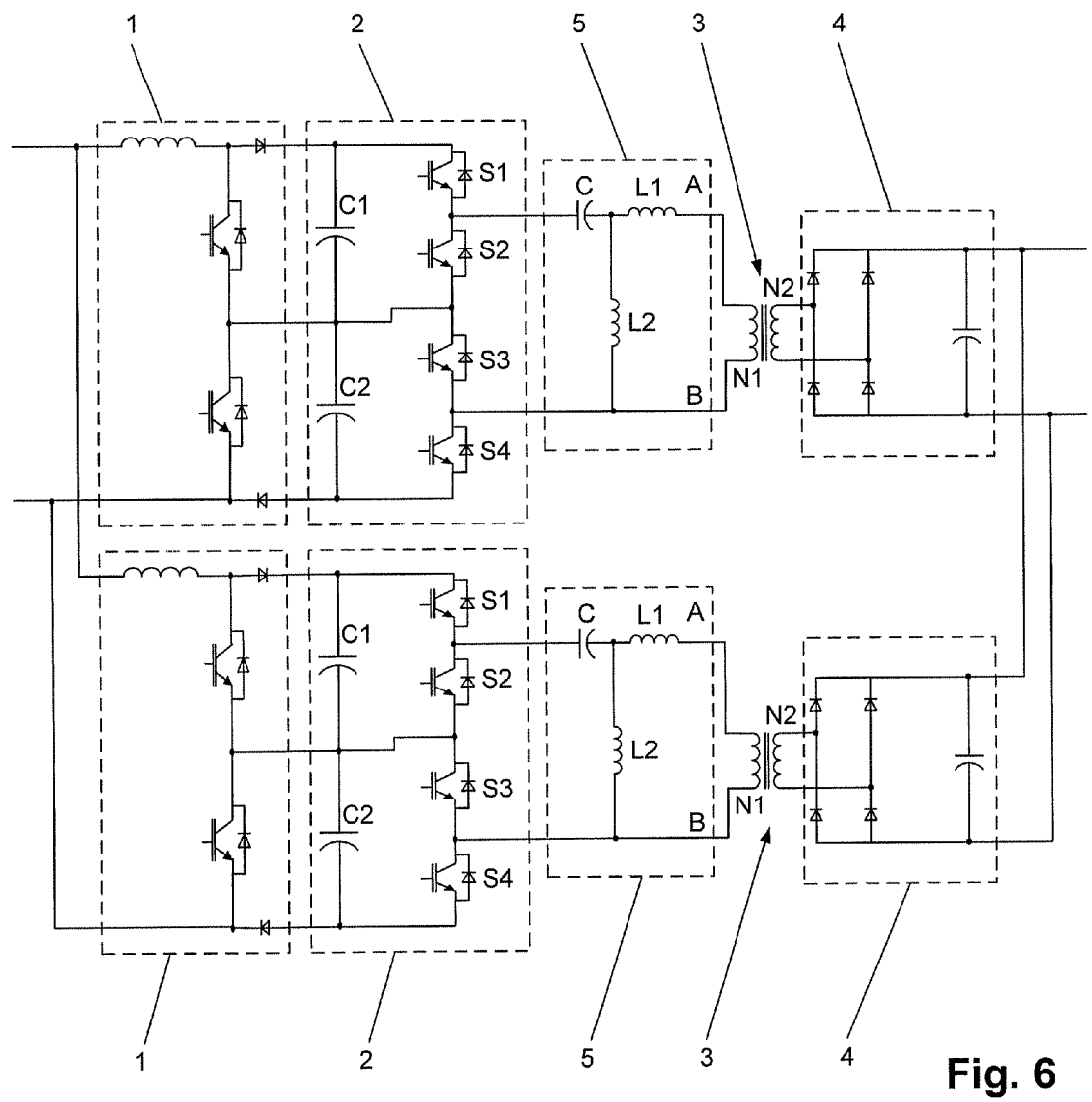
FIG. 6 shows a fourth exemplary embodiment of a system according to the disclosure comprising controller circuits in accordance with FIG. 2.

An exemplary system according to the disclosure generally has at least two of the abovementioned controller circuits according to the disclosure, the step-up controllers 1 of the controller circuits being connected in parallel or in series with one another on the input side. Accordingly, the system is constructed extremely simply, wherein a high input DC current is possible by means of the parallel connection of the step-up controllers 1 on the input side and an increased electrical energy can thus be transferred. The series connection of the step-up controllers 1 on the input side in turn enables a high input DC voltage and thus likewise the transfer of a large amount of electrical energy. Furthermore, in the system according to the disclosure, it is generally possible for the rectifiers 4 of the controller circuits to be connected in parallel or in series with one another on the output side. A high output DC current is possible by means of the parallel connection of the rectifiers 4 on the output side. The series connection of the rectifiers 4 on the output side in turn enables a high output DC voltage. FIG. 3 shows by way of example a first exemplary embodiment of the system according to the disclosure comprising two controller circuits in accordance with FIG. 1, the step-up controllers 1 being connected in series on the input side and the rectifiers 4 being connected in parallel on the output side. FIG. 4 shows by way of example a second exemplary embodiment of the system according to the disclosure comprising two controller circuits in accordance with FIG. 1, the step-up controllers 1 being connected in parallel on the input side and the rectifiers 4 being connected in parallel on the output side. FIG. 5 shows a third exemplary embodiment of the system according to the disclosure comprising two controller circuits in accordance with FIG. 2, the step-up controllers 1 being connected in series on the input side and the rectifiers 4 being connected in parallel on the output side. FIG. 6 shows a fourth exemplary embodiment of the system according to the disclosure comprising two controller circuits in accordance with FIG. 3, the step-up controllers 1 being connected in parallel on the input side and the rectifiers 4 being connected in parallel on the output side.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Step-up controller
2 Resonant converter
3 Transformer
4 Rectifier
5 CLL resonant circuit

What is claimed is:

1. A method for operating a controller circuit having a step-up controller, a resonant converter connected downstream of the step-up controller on an output side, a transformer, a rectifier, connected to a secondary winding of the transformer on an input side, a CLL resonant circuit connected to the resonant converter and to a primary winding of the transformer, wherein the CLL resonant circuit has a resonance capacitance and a first and a second resonance inductance, wherein the resonance capacitance is connected in series with the first resonance inductance, the first resonance inductance being connected to a first connection point of the primary winding of the transformer and the resonance capacitance being connected to the resonant converter, and wherein the second resonance inductance is connected to a junction point between the resonance capacitance and the first resonance inductance, the second resonance inductance being connected to a second connection point of the primary winding of the transformer and the second connection point of the primary winding of the transformer being connected to the resonant converter, wherein the resonant converter has a first capacitive energy store, a second capacitive energy store connected in series with the first capacitive energy store, a third capacitive energy store and a first, a second, a third and a fourth drivable bidirectional power semiconductor switch, the drivable bidirectional power semiconductor switches being connected in series, wherein the first capacitive energy store is connected to the first drivable bidirectional power semiconductor switch and the second capacitive energy store is connected to the fourth drivable bidirectional power semiconductor switch, wherein the third capacitive energy store is connected to a junction point between the first and the second drivable bidirectional power semiconductor switches and to a junction point between the third and the fourth drivable bidirectional power semiconductor switches, and wherein the resonance capacitance is connected to a junction point between the second and the third drivable bidirectional power semiconductor switches and the second connection point of the primary winding of the transformer is connected to a junction point between the second capacitive energy store and the fourth drivable bidirectional power semiconductor switch, the method comprising:

driving the first, second, third and fourth drivable bidirectional power semiconductor switches by means of a drive signal, wherein the drive signal is generated through pulse width modulation, wherein the drive signal for the first drivable bidirectional power semiconductor switch is in phase with respect to a carrier signal of the pulse width modulation, wherein the drive signal for the second drivable bidirectional power semiconductor switch is in antiphase with respect to the carrier signal of the pulse width modulation, wherein a degree of modulation of the drive signal of the first drivable bidirectional power semiconductor switch and a degree of modulation of the drive signal of the second drivable bidirectional power semiconductor switch are chosen in each case to be of an order of magnitude of 25% or 75%, wherein a complementary drive signal for the second drivable bidirectional power semiconductor switch is chosen as the drive signal for the third drivable bidirectional power semiconductor switch, and wherein a complementary drive signal for the second drivable bidirectional power semiconductor switch is chosen as the drive signal for the fourth drivable bidirectional power semiconductor switch.

2. A method for operating a controller circuit having a step-up controller, a resonant converter connected downstream of the step-up controller on an output side, a transformer, a rectifier, connected to a secondary winding of the transformer on an input side, a CLL resonant circuit connected to the resonant converter and to a primary winding of the transformer, wherein the CLL resonant circuit has a resonance capacitance and a first and a second resonance inductance, wherein the resonance capacitance is connected in series with the first resonance inductance, the first resonance inductance being connected to a first connection point of the primary winding of the transformer and the resonance capacitance being connected to the resonant converter, and wherein the second resonance inductance is connected to a junction point between the resonance capacitance and the first resonance inductance, the second resonance inductance being connected to a second connection point of the primary winding of the transformer and the second connection point of the primary winding of the transformer being connected to the resonant converter, wherein the resonant converter has a first capacitive energy store a second capacitive energy store connected in series with the first capacitive energy store, and a first, a second, a third and a fourth drivable bidirectional power semiconductor switch, the drivable bidirectional power semiconductor switches being connected in series, wherein the first capacitive energy store is connected to the first drivable bidirectional power semiconductor switch, a junction point between the first and the second capacitive energy stores is connected to a junction point between the second and the third drivable bidirectional power semiconductor switches, and the second capacitive energy store is connected to the fourth drivable bidirectional power semiconductor switch and the resonance capacitance is connected to a junction point between the first and the second drivable bidirectional power semiconductor switches and the second connection point of the primary winding of the transformer is connected to a junction point between the third and the fourth drivable bidirectional power semiconductor switches, the method comprising:

driving the first, second, third and fourth drivable bidirectional power semiconductor switches by means of a drive signal, wherein the drive signal is generated through pulse width modulation, wherein the drive signal for the first drivable bidirectional power semiconductor switch is in phase with respect to a carrier signal of the pulse width modulation, wherein the drive signal for the fourth drivable bidirectional power semiconductor switch is in antiphase with respect to the carrier signal of the pulse width modulation, wherein the degree of modulation of the drive signal of the first drivable bidirectional power semiconductor switch and the degree of modulation of the drive signal of the fourth drivable bidirectional power semiconductor switch are chosen in each case to be of an order of magnitude of 25% or 75%, wherein a complementary drive signal for the first drivable bidirectional power semiconductor switch is chosen as the drive signal for the second drivable bidirectional power semiconductor switch, and wherein a complementary drive signal for the fourth drivable bidirectional power semiconductor switch is chosen as the drive signal for the third drivable bidirectional power semiconductor switch.

* * * * *